United States Patent
Wang

(10) Patent No.: US 8,074,064 B2
(45) Date of Patent: Dec. 6, 2011

(54) TESTING AND ALERT DEVICE AND METHOD FOR POWER LEAKAGES

(75) Inventor: Yong-An Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 584 days.

(21) Appl. No.: 12/208,603

(22) Filed: Sep. 11, 2008

(65) Prior Publication Data
    US 2009/0282233 A1   Nov. 12, 2009

(30) Foreign Application Priority Data
    May 6, 2008 (CN) .......................... 2008 2 0300674

(51) Int. Cl.
    *G06F 9/00* (2006.01)
    *G06F 15/177* (2006.01)
(52) U.S. Cl. .............................................. 713/2; 713/1
(58) Field of Classification Search .............. 713/1, 2; 700/13
    See application file for complete search history.

(56) References Cited

U.S. PATENT DOCUMENTS

| | | | |
|---|---|---|---|
| 2005/0173538 A1* | 8/2005 | Tsukuda et al. | 235/462.25 |
| 2007/0047904 A1* | 3/2007 | Kimura | 386/83 |
| 2008/0007884 A1* | 1/2008 | Gries et al. | 361/56 |
| 2008/0229087 A1* | 9/2008 | Li | 713/1 |
| 2009/0125123 A1* | 5/2009 | Lu | 700/13 |
| 2009/0177861 A1* | 7/2009 | Mazzola et al. | 711/202 |

* cited by examiner

Primary Examiner — Thomas Lee
Assistant Examiner — Xuxing Chen
(74) Attorney, Agent, or Firm — Altis Law Group, Inc.

(57) ABSTRACT

A testing and alert device for power leakages of a computer includes a basic input/output system (BIOS) chip located on a motherboard of the computer, a south bridge chip connected to the BIOS chip, and an alarm device controlled by the BIOS chip. The south bridge chip has a first general purpose input/output terminal capable of being coupled to a ground of an exterior power source. The BIOS chip is capable of detecting the input signal of the first general purpose input/output terminal of the south bridge chip and outputting an alarm command to initiate the alarming device when the input signal from the first general purpose input/output terminal is at a high level.

12 Claims, 4 Drawing Sheets

TESTING AND ALERT DEVICE AND METHOD FOR POWER LEAKAGES

BACKGROUND

1. Technical Field

The present invention relates to testing and alert devices and methods and, more particularly, to a testing and alert device and method for power leakages of a computer.

2. General Background

As people become more dependent on information obtained from the Internet, computers play an increasingly significant role in our day-to-day activities. Typically, computers have metal enclosures. In use, computers are connected to a 220V city power source. If the computer is not well grounded, the computer enclosure may experience static electricity, that is, power leakage, thereby affecting users' safety when using computers. Under normal circumstances, the computer power supply is connected to a city power source socket with good grounding to conduct the static electricity to ground, thereby ensuring computer's safety. However, the computer may be in an unsafe power environment and connected to a power source with improper grounding. As a result, computers may experience power leakage, thereby damaging the computer's motherboard as well as putting the safety of users at risk.

What is needed, therefore, is a device and method for power leakages of a computer to overcome the above-described shortcoming.

SUMMARY

A testing and alert device for power leakages of a computer, includes a basic input/output system (BIOS) chip located on a motherboard of the computer; a south bridge chip connected to the BIOS chip, and an alarm device controlled by the BIOS chip. The south bridge chip has a first general purpose input/output terminal capable of being coupled to a ground of an exterior power source. The BIOS chip is capable of detecting the input signal of the first general purpose input/output terminal of the south bridge chip and outputting an alarm command to initiate the alarming device when the input signal from the first general purpose input/output terminal is at a high level.

DETAILED DESCRIPTION OF THE EMBODIMENTS

Figure 1:
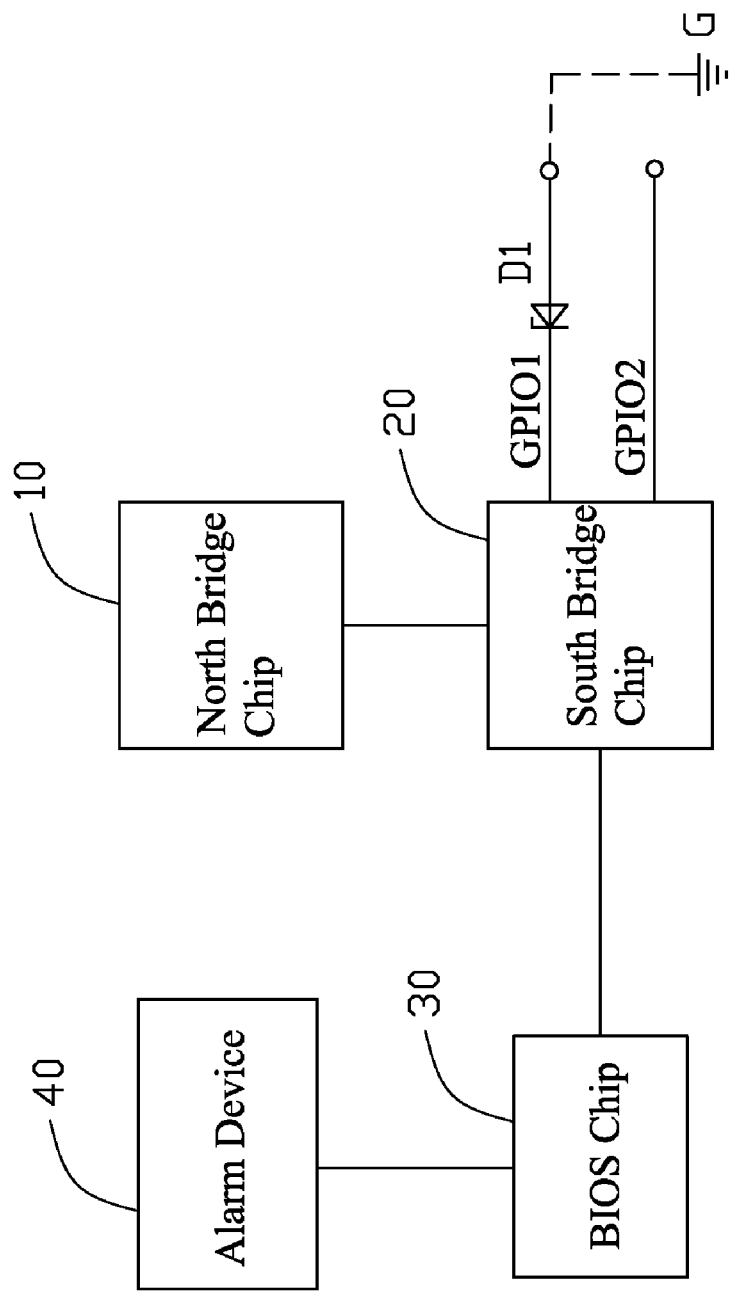
FIG. 1 is a block diagram of one embodiment of a testing and alert device for power leakages of a computer.

FIG. 1 is a block diagram of a testing and alert device to test and alert power leakages of a computer. The testing and alert device includes a north bridge chip 10 located on a motherboard of the computer, a south bridge chip 20 connected to the north bridge chip 10, a basic input/output system (BIOS) chip 30 connected to the south bridge chip 20, and an alarm device 40 controlled by the BIOS chip 30 to indicate the computer power leakage. The south bridge chip 20 includes a first general purpose input/output terminal GPIO1 and a second general purpose input/output terminal GPIO2. The first general purpose input/output terminal GPIO1 is capable of being coupled to a ground G of an exterior power source (such as a 220V city power source) via a zener diode D1. The cathode of the zener diode D1 is connected to the south bridge chip 20, while the anode of the zener diode D1 is coupled to the ground G of the exterior power source, to protect the first general purpose input/output terminal GPIO1 from damage due to overvoltage.

Figure 2:
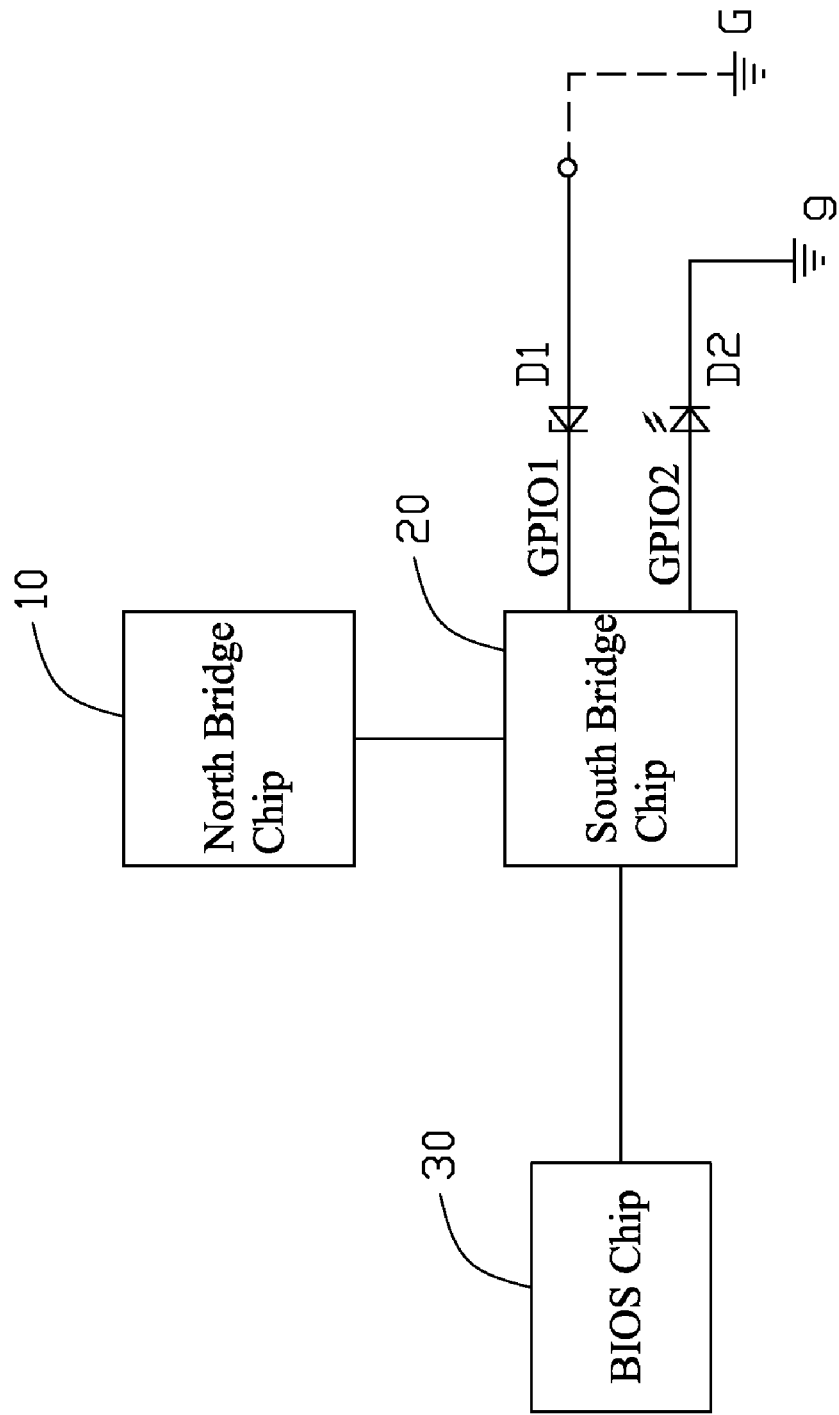
FIG. 2 is a block diagram of a first embodiment of the testing and alert device of FIG. 1.

Referring to FIG. 2, in a first embodiment, the alarm device 40 is a light emitting diode D2 connected between the second general purpose input/output terminal GPIO2 of the south bridge chip 20 and a ground g of an interior power source of the motherboard. The anode of the light emitting diode D2 is connected to the GPIO2, while the cathode of the light emitting diode D2 is connected to the ground g. The south bridge chip 20 is configured to control the light emitting diode to illuminate according to a command from the BIOS chip 30.

Figure 3:
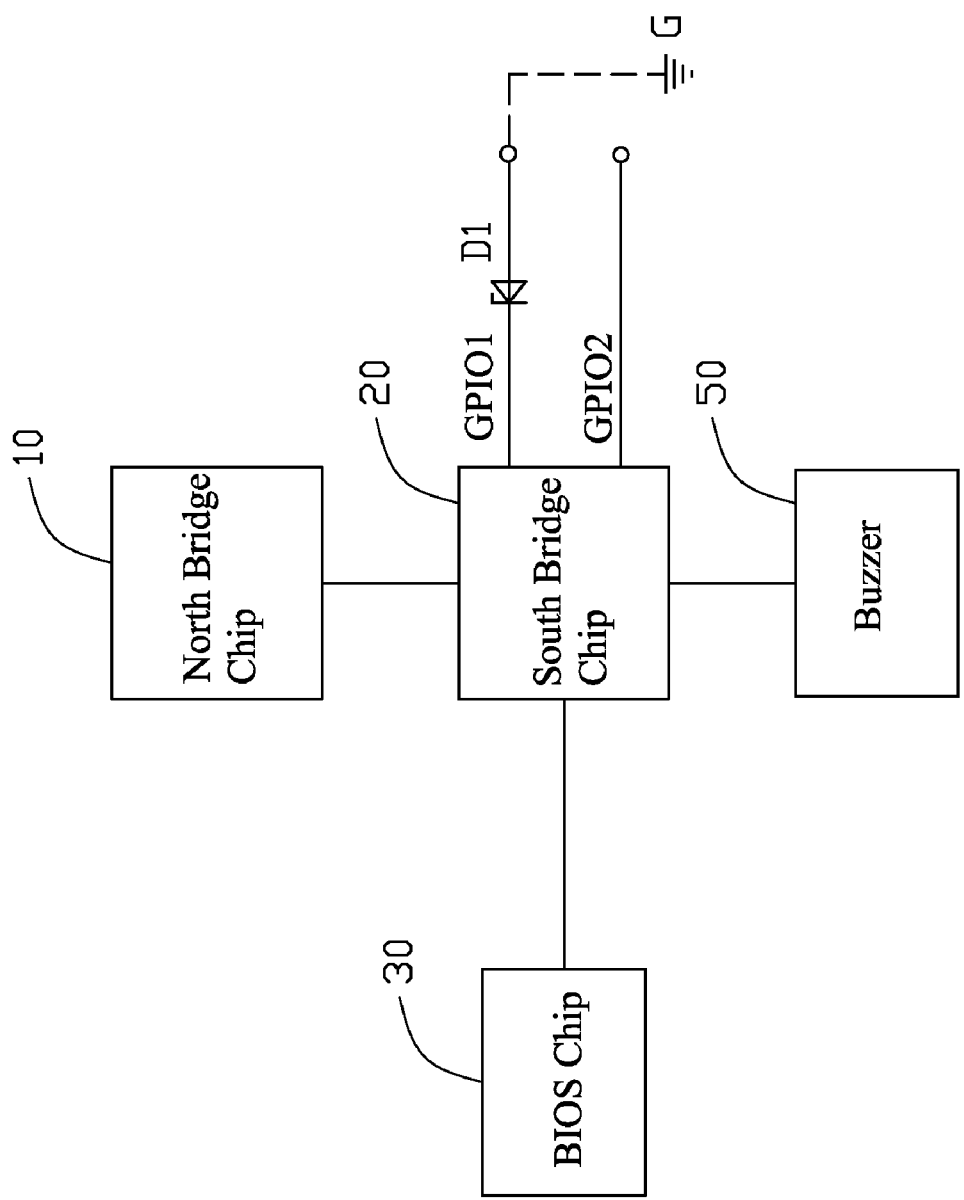
FIG. 3 is a block diagram of a second embodiment of the testing and alert device of FIG. 1.

Referring to FIG. 3, in a second embodiment, the alarm device is a buzzer 50 connected to the south bridge chip 20. The buzzer 50 is capable of being controlled to ring by the south bridge chip 20 according to a command from the BIOS chip 30.

Figure 4:
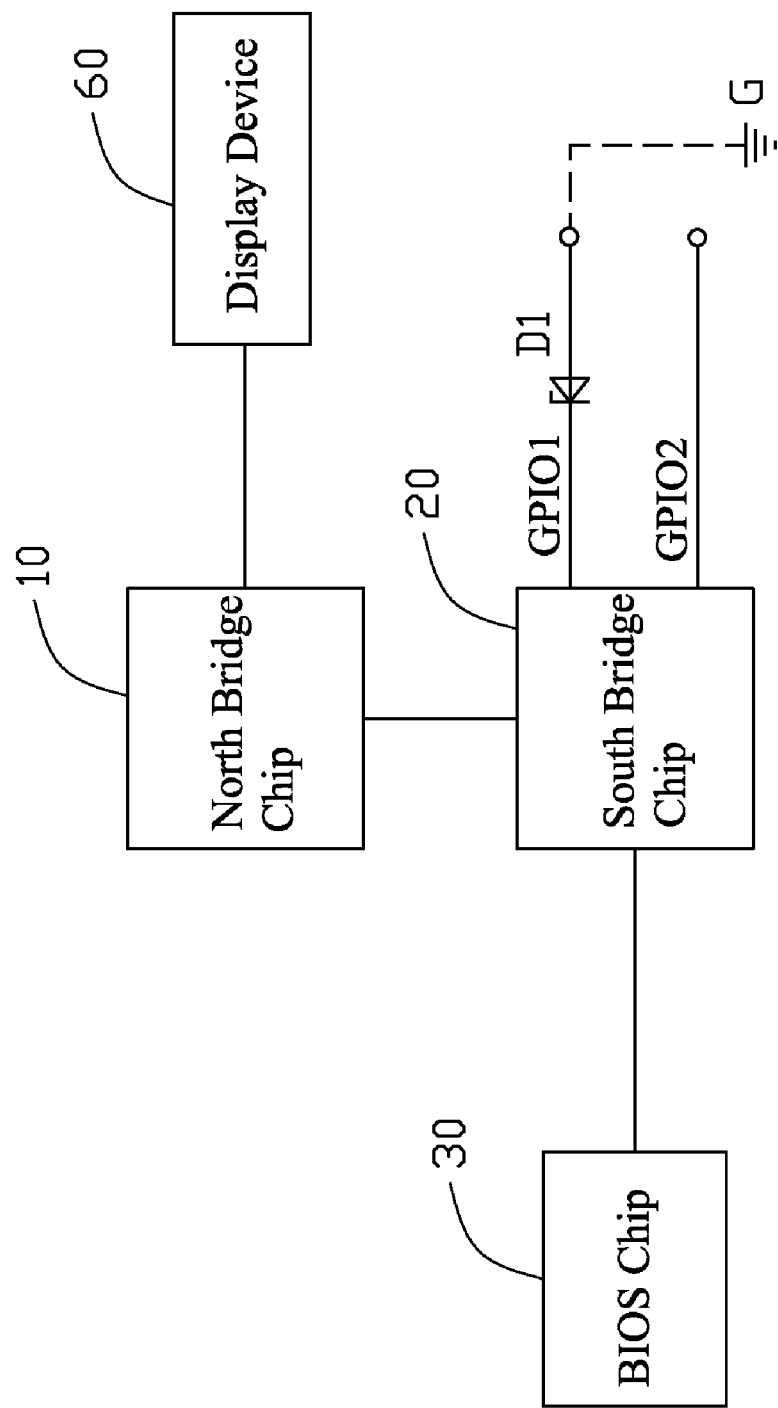
FIG. 4 is a block diagram of a third embodiment of the testing and alert device of FIG. 1.

Referring to FIG. 4, in a third embodiment, the alarm device is a display device 60 connected to the north bridge chip 10. The display device 60 is configured to display the information of power leakages preset in the BIOS chip 30 by the north bridge chip 10.

In use, the computer is matched to a city power supply (220V or 110V voltage source) socket. If the city power supply socket is well grounded, the anode of the zener diode D1 is actually connected to the ground G. The first general purpose input/output terminal GPIO1 inputs a low level signal to the south bridge chip 20. If the city power supply socket is not grounded or is poorly grounded, and the computer enclosure experience static electricity, a high level signal is input to the first purpose input/output terminal GPIO1 of the south bridge chip 20. Prior to usage, users are capable of inputting specific operating programs into the BIOS chip to control the test procedure and select one of the three alarm manners as mentioned. When the computer is started up, the BIOS chip 30 executes a power on self test and initializes the system. If the BIOS chip 30 detects a low level signal from the first general purpose input/output terminal GPIO1, the computer proceeds to start up. If the BIOS chip 30 detects a high level signal from the first general purpose input/output terminal GPIO1, the power supply of the computer is experiencing power leakage, and one of the three alarms is initiated according to the command output by the BIOS chip to inform users of the computer's power leakage.

In the first embodiment, when a power leakage occurs, the second general purpose input/output terminal GPIO2 of the south bridge chip 20 is configured to output a high level signal to illuminate the light emitting diode D2, thereby informing users of the power leakage and allowing them to act accordingly. In the second embodiment, when a power leakage occurs, the buzzer 50 is configured to ring according to a command output by the BIOS chip 30. In the third embodiment, the display device 60 is controlled by the north bridge chip 20 to display error information regarding the power leakage according to a command output by the BIOS chip 30. During usage, users can choose one of the three alarms to indicate a power leakage.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing and alert device for power leakages of a computer, the device comprising:
   a basic input/output system (BIOS) chip located on a motherboard of the computer;
   a south bridge chip connected to the BIOS chip, the south bridge chip having a first general purpose input/output terminal capable of being coupled to a ground of an exterior power source; and
   an alarm device controlled by the BIOS chip;
   wherein the BIOS chip is configured to detect an input signal of the first general purpose input/output terminal of the south bridge chip and output an alarm command to initiate the alarm device when the input signal from the first general purpose input/output terminal is coupled to the ground at a high level.

2. The device as described in claim 1, wherein the first general purpose input/output terminal is capable of being coupled to the ground of the exterior power source via a zener diode for protecting the first general purpose input/output terminal from being damaged due to overvoltage, the cathode of the zener diode is connected to the first general purpose input/output terminal, the anode of the zener diode is capable of being coupled to the ground of the exterior power source.

3. The device as described in claim 1, wherein the alarm device is a light emitting diode configured to illuminate by the alarm command.

4. The device as described in claim 3, wherein the south bridge chip further comprises a second general purpose input/output terminal; the anode of the light emitting diode is connected to the second general purpose input/output terminal; the cathode of the light emitting diode is connected to the ground of the motherboard.

5. The device as described in claim 1, wherein the alarm device is a buzzer connected to the south bridge chip configured to ring by the alarm command.

6. The device as described in claim 1, further comprising a north bridge chip connected to the south bridge chip, wherein the alarm device is a display device connected to the north bridge chip configured to display power leakage information by the alarm command.

7. A testing and alert method for power leakage of a computer comprising a motherboard, a basic input/output system (BIOS) chip located on a motherboard, a south bridge chip having a first general purpose input/output terminal connected to the BIOS chip, and an alarm device connected to and controlled by the BIOS chip, the method comprising:
   coupling the first general purpose input/output terminal of the south bridge chip to a ground terminal of an exterior power source;
   detecting an input signal of the first general purpose input/output terminal; and
   outputting an alarm command to initiate the alarm device, upon the condition the BIOS chip detects a high level input signal at the first general purpose input/output terminal indicating the ground terminal of the exterior power source is not actually grounded.

8. The method as described in claim 7, wherein the first general purpose input/output terminal is coupled to the ground terminal of the exterior power source via a zener diode for protecting the first general purpose input/output terminal from being damaged due to overvoltage, the cathode of the zener diode is connected to the first general purpose input/output terminal, the anode of the zener diode is coupled to the ground terminal.

9. The method as described in claim 7, wherein the alarm command controls a light emitting diode to illuminate.

10. The method as described in claim 9, wherein the south bridge chip further comprises a second general purpose input/output terminal; the anode of the light emitting diode is connected to the second general purpose input/output terminal; the cathode of the light emitting diode is connected to the ground of the motherboard.

11. The method as described in claim 7, wherein the alarm command signals a buzzer connected to the south bridge chip to alarm.

12. The testing and alert method for power leakages as described in claim 7, further comprising a north bridge chip connected to the south bridge chip, wherein the alarm command signals a display device connected to the north bridge chip to display the power leakage information.

* * * * *